United States Patent
Anscher et al.

(10) Patent No.: US 6,932,552 B2
(45) Date of Patent: *Aug. 23, 2005

(54) PRELOADABLE RETAINER

(75) Inventors: Joseph Anscher, Muttontown, NY (US); Paul Matwey, Mt. Sinai, NY (US)

(73) Assignee: National Molding Corp., Farmingdale, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/681,769

(22) Filed: Oct. 8, 2003

(65) Prior Publication Data

US 2004/0247410 A1 Dec. 9, 2004

Related U.S. Application Data

(63) Continuation-in-part of application No. 10/456,665, filed on Jun. 6, 2003.

(51) Int. Cl.[7] ................................................ F16B 13/04
(52) U.S. Cl. ........................... 411/41; 411/45; 411/508; 24/297
(58) Field of Search .............................. 411/41, 45–53, 411/508–510, 913; 24/297, 453, 606, 607

(56) References Cited

U.S. PATENT DOCUMENTS

| | | | | |
|---|---|---|---|---|
| 3,631,738 A | * | 1/1972 | Harper | ...................... 74/502.4 |
| 3,701,302 A | * | 10/1972 | Pestka et al. | ................... 411/15 |
| 4,085,651 A | | 4/1978 | Koscik | |
| 4,136,599 A | * | 1/1979 | Hammer, Jr. | .................. 411/16 |
| 4,506,419 A | * | 3/1985 | Mitomi | ........................ 24/297 |
| 4,571,134 A | * | 2/1986 | Beglinger et al. | ............. 411/41 |
| 4,952,106 A | * | 8/1990 | Kubogochi et al. | ............ 411/48 |
| 5,689,863 A | * | 11/1997 | Sinozaki | ....................... 24/297 |
| 5,775,860 A | | 7/1998 | Meyer | |
| 6,045,309 A | | 4/2000 | LeVey | |
| 6,074,144 A | | 6/2000 | Meyer | |
| 6,474,921 B1 | * | 11/2002 | Gordon | ....................... 411/508 |
| 6,511,108 B1 | * | 1/2003 | Roessner, III et al. | ....... 292/320 |
| 6,533,515 B2 | | 3/2003 | Meyer | |
| 6,560,819 B2 | * | 5/2003 | Mizuno et al. | ................ 16/2.2 |

* cited by examiner

Primary Examiner—Flemming Saether
(74) Attorney, Agent, or Firm—Collard & Roe, P.C.

(57) ABSTRACT

A fastener comprises an anchor and a central pin. The anchor has a top plate to which a central leg is connected. At the free end of the central leg are two anchor arms that extend up and outward from the free end, forming an arrowhead shape. Each anchor arm has an outwardly extending lip connected to its free end. The anchor arms are flexible and can flex inward as the anchor is placed through a hole in an item to be fastened. Connected to the top surface of the top plate is a push pin. Depressing the push pin breaks the connection areas to create a two-piece anchor from the single part. The push pin comprises a push button and a pin connected to the underside of the push button. The pin consists of a vertical post having a channel therein for accommodating the central leg of the anchor. Pushing the push button downward causes the anchor arms to be pushed outward and to anchor the fastener into the items to be fastened.

6 Claims, 5 Drawing Sheets

PRELOADABLE RETAINER

CROSS REFERENCE TO RELATED APPLICATIONS

This is a continuation-in-part of U.S. patent application Ser. No. 10/456,665 filed on Jun. 6, 2003, the disclosure of which is herein incorporated by reference.

BACKGROUND OF THE INVENTION

1. Field of the Invention

This invention relates to a preloadable retainer for fastening two planar objects together. In particular, the invention relates to a fastener comprising an anchor and a push pin that is particularly useful for fastening automotive body panels to sheet metal.

2. The Prior Art

Anchor type fasteners having a central pin are known. For example, U.S. Pat. No. 4,571,134 to Beglinger et al. shows a two-piece plastic fastener comprising an anchor and a central pin. The anchor comprises a closed V-shaped insertion portion and a top plate. The anchor is placed through two (or more) planar items to be fastened together. A central pin extends down between the arms of the V and causes the arms to spread when the pin is fully depressed. This spreading anchors the fastener in the rear item and prevents the fastener from coming out. The plate prevents the front item from coming away from the rear item. While this type of fastener is widely used, the closed V-shape of the anchor makes it difficult to install. This is because a large amount of force is required to cause the arms of the V to bend inward sufficiently to pass through an aperture in the item to be mounted, and outward sufficiently enough to let the pin extend to its fully inserted position and retain the anchor in the item. The anchor must bend enough during insertion of the pin so as to prevent the anchor from being inadvertently pulled out by a counter force acting on the items.

Other fasteners using the same concept are shown in U.S. Pat. Nos. 6,533,515, 6,074,144 and 5,775,860 all to Meyer, as well as U.S. Pat. No. 6,045,309 to LeVey. These fasteners all suffer the same drawback as Beglinger: the closed V formation of the anchor is so resistant to bending that a large amount of force is required to insert the fastener, and bring it into a locked position.

A plastic fastener having a different configuration is shown in U.S. Pat. No. 4,085,651 to Koscik. In this fastener, the anchor consists of two parallel legs that extend below the plate. Depressing the center pin forces the legs to bend outwards and retain the fastener in the item. This fastener suffers the drawback that the parallel legs are more difficult to insert into a small aperture in the item, as they must often be squeezed together by the operator's fingers in order for the anchor to be inserted.

In large capacity use, such as automobile assembly lines, it is imperative that the fasteners used to attach body panels to the automobile frame be quick and easy to install in large quantities. Since the fasteners are inserted by hand, they should not require undue force to complete the insertion, due to operator fatigue. They should also be able to be installed using a minimum number of steps.

SUMMARY OF THE INVENTION

It is therefore an object of the invention to provide a fastener that is simple to install with a low amount of force.

It is another object of the invention to provide a fastener that is strong and reliable.

It is another object of the invention to provide a fastener that does not require assembly prior to use.

It is yet another object of the invention to provide a fastener that is simple and inexpensive to manufacture.

These and other objects are accomplished by a fastener comprising an anchor and a central pin. The anchor comprises a top plate to which a central leg is connected. The central leg extends perpendicularly down from the top plate. At the free end of the central leg are two anchor arms that extend up and outward from the free end, forming an arrowhead shape. Each anchor arm has a free end facing upward. The anchor arms are flexible and can flex inward as the anchor is placed through a hole in an item to be fastened.

At the free end of each anchor arm is a lip that extends outward. This lip extends through the apertures in the body panels to be fastened and rests against the top face of the top panel and provides additional strength and support to the fastened arrangement.

Connected to the top surface of the top plate is a push pin assembly. The push pin assembly is integrally molded with the top surface of the top plate via small connection areas. This way, only a single mold is required for molding the fastener. Depressing the push pin breaks the connection areas to create a two-piece anchor from the single part. The push pin comprises a push button and a pin connected to the underside of the push button. The pin consists of a vertical post having a channel therein for accommodating the central leg of the anchor. Pushing the push button downward causes the pin to slide along the central leg until the end of the pin abuts the inner surface of the anchor legs. This causes the anchor arms to be pushed outward and to anchor the fastener into the items to be fastened.

Preferably, there are guide flanges located on an inner surface of the anchor arms, that guide the pin and keep it aligned with the central leg as it slides down toward the bottom of the anchor. The flanges extend out around one side of the anchor, on the opposite face of the pin from the channel, to prevent the pin from moving laterally beyond a predetermined limit. The pin has a notch cut into its lower end. When the bottom of the pin contacts the guide flange, the flange snaps into the notch and prevents upward movement of the pin. An additional notch and flange arrangement is located higher up on the pin and anchor assembly and also snaps closed to provide further insurance against upward movement of the pin after the fastener is in its fully locked position.

Preferably, the fastener can be set to a pre-loaded state prior to insertion into the items to be fastened. When the fastener is first molded, the pin is integrally formed with the anchor and extends up though an aperture in the top plate. The aperture is preferably U-shaped to accommodate the channel-containing pin structure. Pressing the push button down slightly causes the connections to the anchor to break and causes the pin to slide through the aperture into a partially inserted position. In this pre-loaded state, the fastener can be easily inserted into the items to be fastened, and then only a small pressing motion on the push pin can move the fastener into a fully locked position. Prior to achieving the fully locked position, the pin can freely move up and down within the anchor. There are preferably grooves on the pin that lock into protrusions located underneath the top plate after the pin has been fully inserted in the top plate, to prevent the pin from sliding back up out of the apertures after full insertion into the anchor.

The open V-shape of the anchor arms gives them extra flexibility so that insertion of the pin into apertures in the items to be fastened is simple and does not require a lot of force. Similarly, pressing the push pin into the anchor legs does not require a lot of force for the legs to extend outward and lock the fastener to the items to be fastened.

Because the fastener is molded with the pin and anchor already together, it does not require any assembly to use. Traditional two-piece anchor systems require assembling of the pin and anchor prior to use, requiring additional time and causing additional operator fatigue. In the present invention, all that is required to use the anchor is depressing the pin enough to break the connections and pre-load the fastener. This can be done on the manufacturing end or on the assembly line.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figures 1, 2:
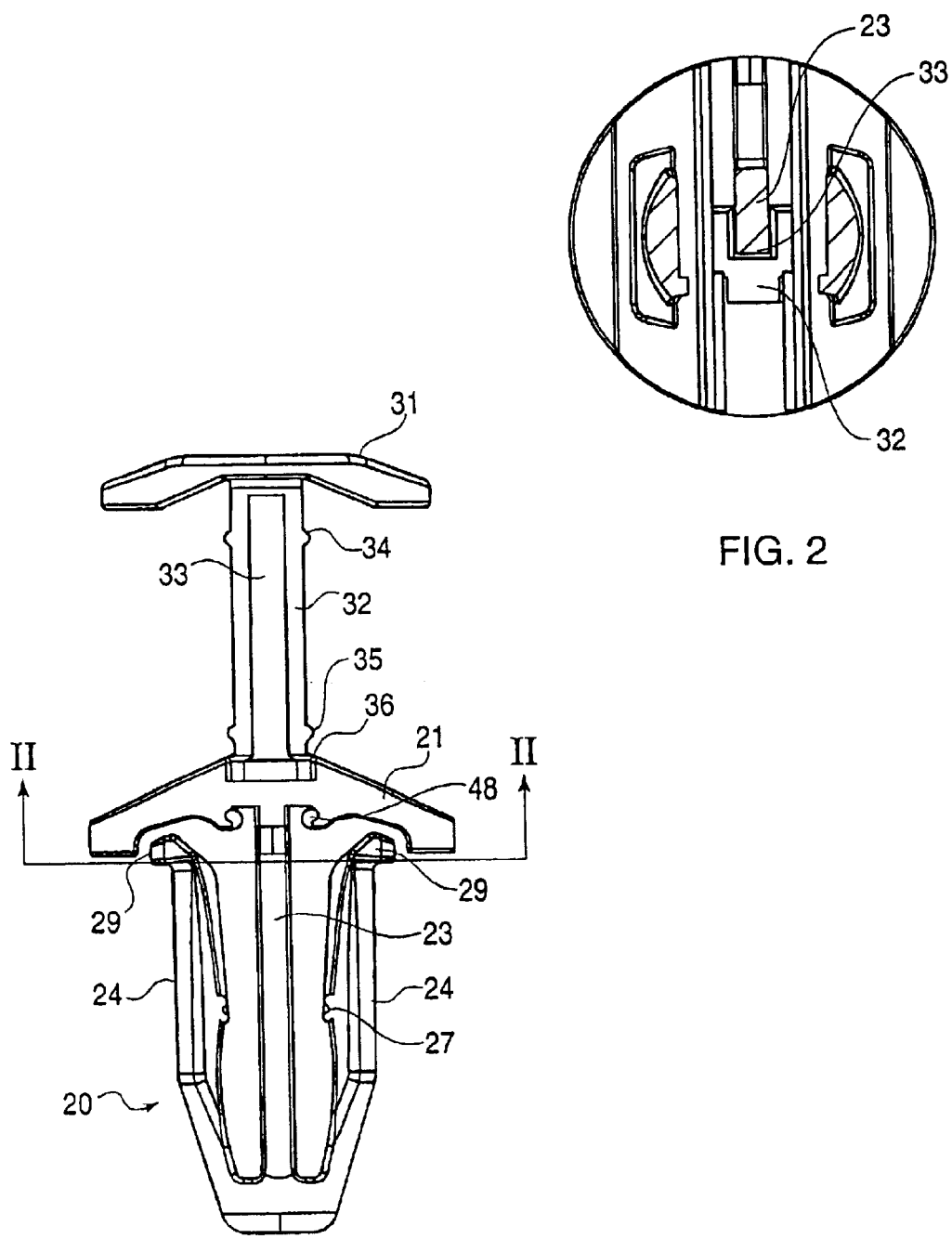
FIG. 1 shows a front view of one embodiment of the fastener according to the invention in an initial molded state.
FIG. 2 shows a cross-sectional view along lines II—II of FIG. 1.
Figure 5:
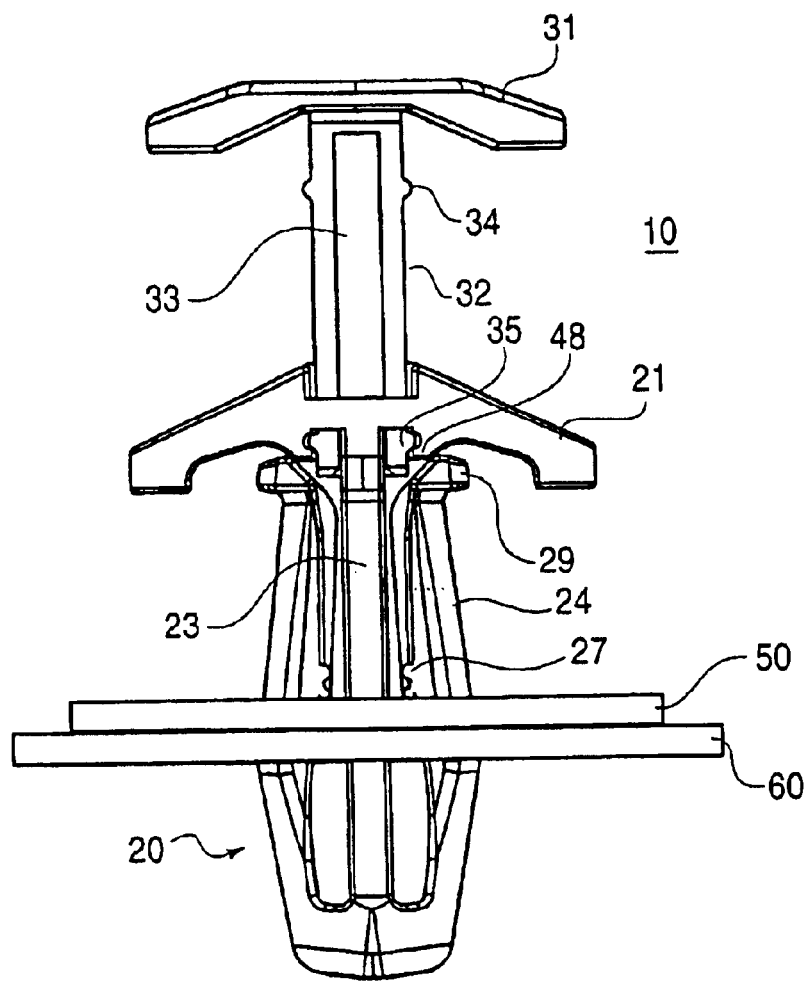
FIG. 5 shows a front view of the fastener of FIG. 1 partially inserted into two layers to be fastened together.
Figure 6:
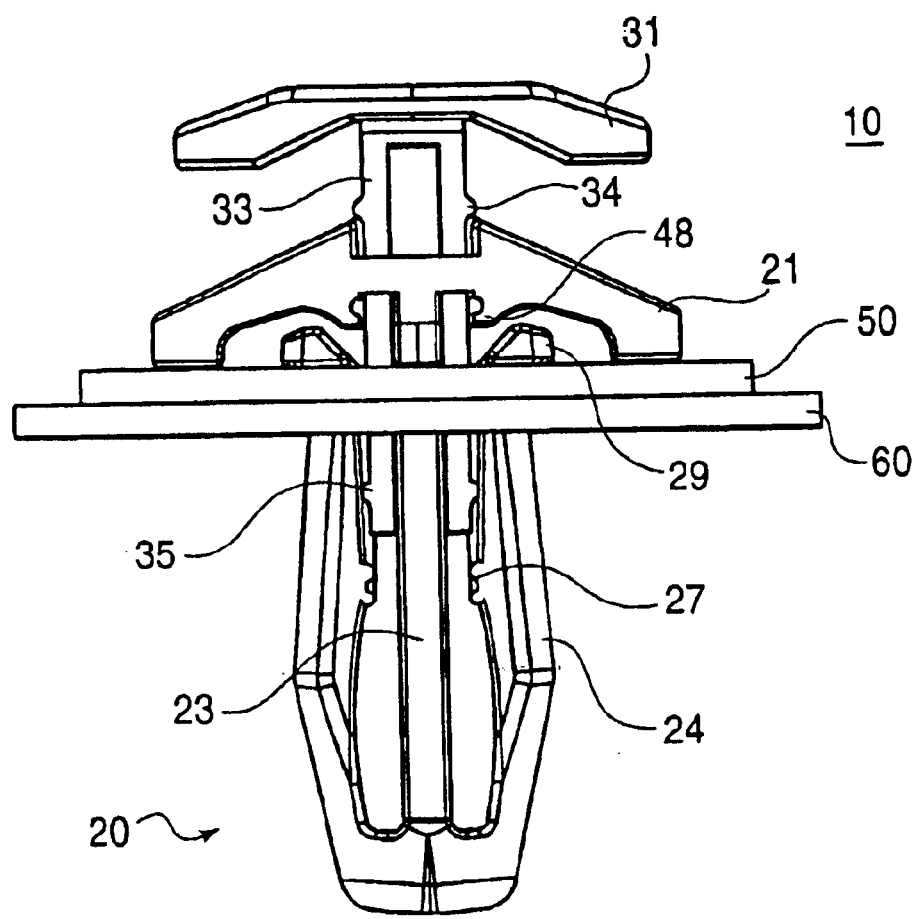
FIG. 6 shows a front view of the fastener of FIG. 1 installed on the two layers, prior to locking.
Figure 7:
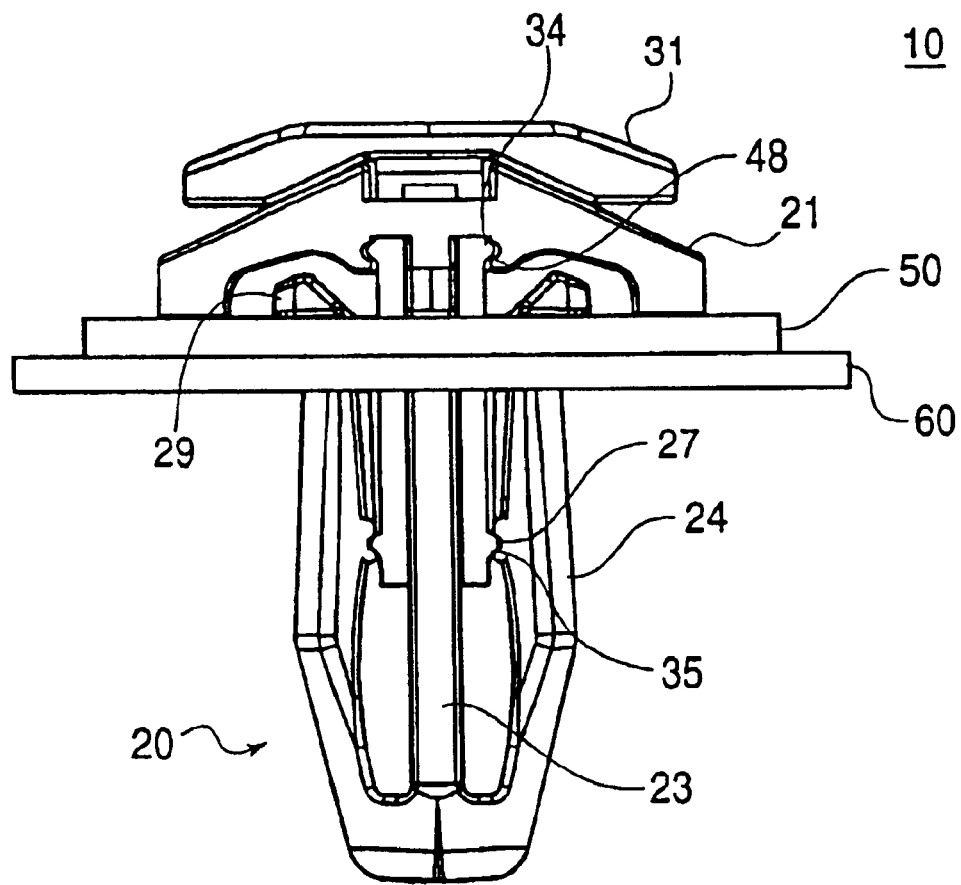
FIG. 7 shows a front view of the fastener of FIG. 1 in a fully locked state.

Referring now in detail to the drawings, FIGS. 1–7 show the fastener 10 according to the invention as it goes from an initially molded state (FIG. 1) into a fully locked position (FIG. 7). FIG. 1 shows the fastener 10 according to the invention in an initial molded state. Fastener 10 comprises an anchor 20 and a push pin assembly 30. Anchor 20 has a top plate 21 connected to a central leg 23. Central leg 23 extends substantially perpendicular to the bottom surface of top plate 21. There are two flexible anchor arms 24 connected to the free end of central leg 23. Each anchor arm 24 extends up and away from central leg 23. At the free end of each anchor arm 24 is a lip 29.

Push pin assembly 30 comprises a push button 31 and a pin 32 connected to and extending downward from the bottom surface of push button 31. Pin 32 is adapted to fit through an aperture 22 in top plate 21, such that pushing push button 31 causes pin 32 to extend through the aperture 22 as push button 31 is depressed to force anchor arms 24 to bend away from central leg 23 and away from each other. (See FIGS. 3–7).

As shown in FIG. 1, and in greater detail in FIG. 2, pin portion 32 has a channel 33 cut therein. Channel 33 corresponds in shape to central leg 23 of anchor 20, so that depressing push button 31 causes pin 32 to slide along central leg 23 with the central leg 23 fitting at least partially within channel 33 (See FIG. 2). This way, central leg 23, in addition to supporting anchor arms 24, acts as a guide for pin 32.

Figure 3:
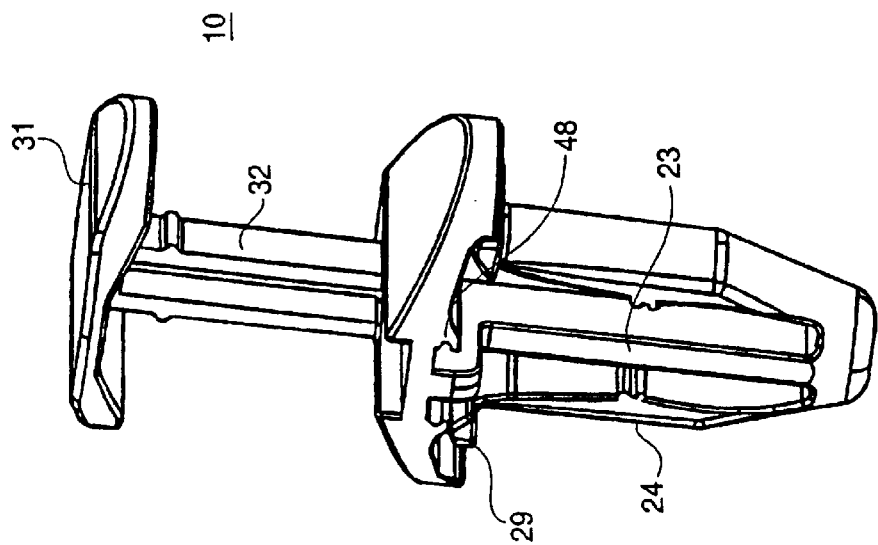
FIG. 3 shows a perspective view of the fastener of FIG. 1 in a pre-loaded state.

FIG. 1 shows fastener 10 in its initially molded state. Push pin assembly 30 is integrally molded with anchor 20 via connection points 36 connecting top plate 21 with a bottom section of pin 32. As shown in FIGS. 2 and 3, a downward pressure on push button 31 causes connection points 36 to break and pin 32 to extend through aperture 22 in top plate 21, into a pre-loaded position. This action can be easily done at either the manufacturing level or at the installation site, prior to installation of fastener 10.

Figure 4:
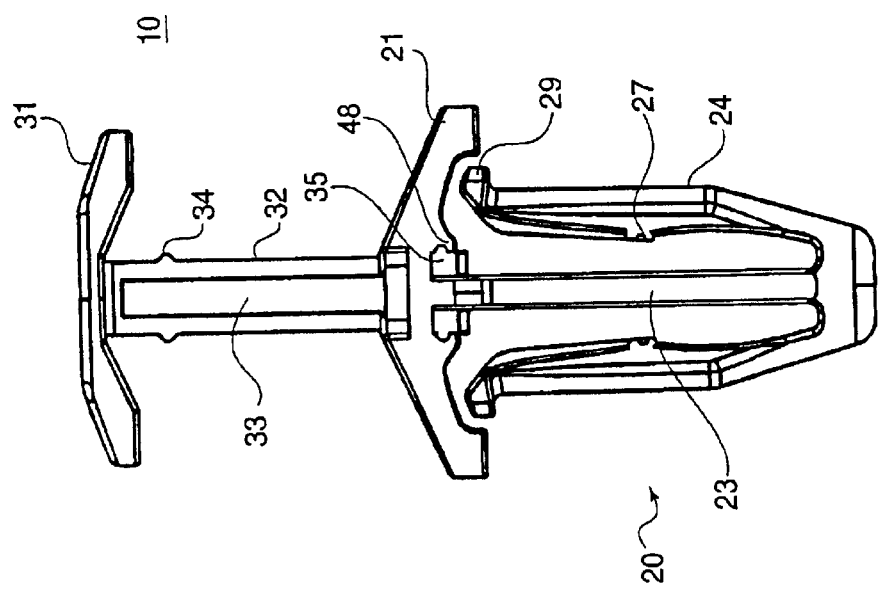
FIG. 4 shows a front view of the fastener of FIG. 3.

FIGS. 4–6 show the installation of fastener 10 on two flat items 50 and 60. Typically, items 50 and 60 would be an automobile body panel and sheet metal, respectively, but any substantially flat item could be fastened with fastener 10. First, fastener 10 is inserted through an aperture in items 50 and 60, with lips 29 on anchor arms 24 extending outside the aperture to create a stable connection between fastener 10 and panels 50 and 60. As push button 31 is depressed and anchor arms are forced outwardly by the extension of pin 32 around leg 23, this outward extension of anchor arms 24 retains anchor 20 securely within items 50 and 60 (see FIGS. 5 and 6).

There is a locking mechanism to lock fastener 10 in a locked position on items 50 and 60, which comprises notches 34 and 35 in pin 32. A retaining flange on anchor arms 24 catches notches 35 to prevent upward movement of pin 32 once push button 31 is fully depressed. There is a further set of notches 34 in pin 32, and a pair of hooks 48 extending underneath the bottom surface of top plate 21. Depressing push button 31 completely causes hooks 48 to engage notches 35 and further prevent upward movement of push pin assembly 30.

The fastener according to the present invention requires no assembly, is simple to install, does not cause extensive operator fatigue and allows for reliable fastening of two or more planar items together.

Accordingly, while only a single embodiment of the present invention has been shown and described, it is obvious that many changes and modifications may be made thereunto without departing from the spirit and scope of the invention.

What is claimed is:

1. A fastener comprising:
   an anchor comprising:
   (a) a top plate having a top surface and a bottom surface;
   (b) a central leg connected to and extending substantially perpendicular to the bottom surface of the top plate, said central leg having a free end;
   (c) at least one anchor arm connected to the free end of the central leg, said anchor arm extending up and away from the central leg and having a free end; and
   (d) an outwardly extending lip connected to the free end of the anchor arm; and
   a push pin assembly comprising:
   a push button having a top surface and a bottom surface;
   a pin portion connected to and extending downward from the bottom surface of the push button, said pin being adapted to fit through an aperture in the top plate, such that pushing the push button causes the pin portion to extend through the aperture parallel to the central leg and force the at least one anchor arm further outwardly, wherein the pin has a channel cut therein, the channel corresponding in shape to the central leg of the anchor, wherein depressing the push button causes the pin to slide along the central lea with the central leg fitting at least partially within the channel; and a locking device for locking the push pin in a depressed state.

2. The fastener according to claim 1, wherein the aperture has a shape that corresponds to a cross-sectional shape of the pin.

3. The fastener according to claim 1, wherein the push pin assembly is integrally molded with the anchor via connection points connecting the top plate with a bottom portion of the pin, and wherein downward pressure on the push button causes the connection points to break and the pin to extend through the aperture in the top plate.

4. The fastener according to claim 1, wherein there are two anchor arms.

5. The fastener according to claim 1, wherein the locking mechanism comprises at least one notch in the pin, and a retaining flange on the at least one anchor arm, said retaining flange catching in said notch and preventing upward movement of the pin once the push button is fully depressed.

6. The fastener according to claim 5, wherein the locking mechanism further comprises at least one protrusion in the pin and at least one hook underneath the bottom surface of the top plate, wherein depressing the push button completely causes the at least one hook underneath the bottom surface to engage the at least one protrusion and prevent upward movement of the push pin assembly.

* * * * *